United States Patent [19]

Tatum

[11] Patent Number: 4,762,189
[45] Date of Patent: Aug. 9, 1988

[54] SEAL AND SEAL SHIELD ASSEMBLY FOR ROTARY DRILL BITS

[76] Inventor: David M. Tatum, 9251 Burdine, No. 386, Houston, Tex. 77096

[21] Appl. No.: 55,126

[22] Filed: May 28, 1987

[51] Int. Cl.[4] .............................................. E21B 10/22
[52] U.S. Cl. ...................................... 175/371; 277/82; 277/92; 277/96; 277/236
[58] Field of Search ................... 175/371, 372; 384/94; 277/92, 94, 96, 96.2, 82–84, 86, 188 A, 236, 165

[56] References Cited

U.S. PATENT DOCUMENTS

| | | | |
|---|---|---|---|
| 4,168,868 | 9/1979 | Shields | 175/372 X |
| 4,176,848 | 12/1979 | Lafuze | 175/371 X |
| 4,178,045 | 12/1979 | Neilson | 384/94 |
| 4,209,890 | 7/1980 | Koskie, Jr. | 175/371 X |
| 4,516,641 | 5/1985 | Burr | 175/372 X |
| 4,552,233 | 11/1985 | Klima | 175/371 |

FOREIGN PATENT DOCUMENTS

| | | | |
|---|---|---|---|
| 3421171 | 6/1986 | Fed. Rep. of Germany | 384/94 |
| 350923 | 9/1972 | U.S.S.R. | 175/372 |

*Primary Examiner*—Stephen J. Novosad
*Assistant Examiner*—Hoang C. Dang

*Attorney, Agent, or Firm*—Kenneth Keeling; Neal J. Mosely

[57] ABSTRACT

A seal and seal shield assembly for rotary drill bits having a journal member comprising a first bearing member, and a rolling cutter with a bore having an open end rotatably mounted thereon comprising a second bearing member. The rolling cutter has a counterbore at the open end defining an annular cavity. The seal and seal shield assembly is compression-loaded in the cavity to retain lubricant in the bit. The seal assembly has a pair of annular rings each with a radially extending wall and an axially extending wall defining an annular seal gland. An elastic spring member compression-loaded in the seal biases the exterior surfaces against the bearing surfaces. A flat malleable annular disc with lubricating properties is positioned at the outer face of the seal assembly and a rigid annular disc is positioned in supporting relation thereto. A second flat malleable annular disc is positioned at the outer face of the rigid disc adjacent to the journal member seal thrust face. The malleable annular disc members deform under pressure and extrude to seal voids at the bearing surfaces and to prevent the entrance of abrasive particulate matter.

33 Claims, 2 Drawing Sheets

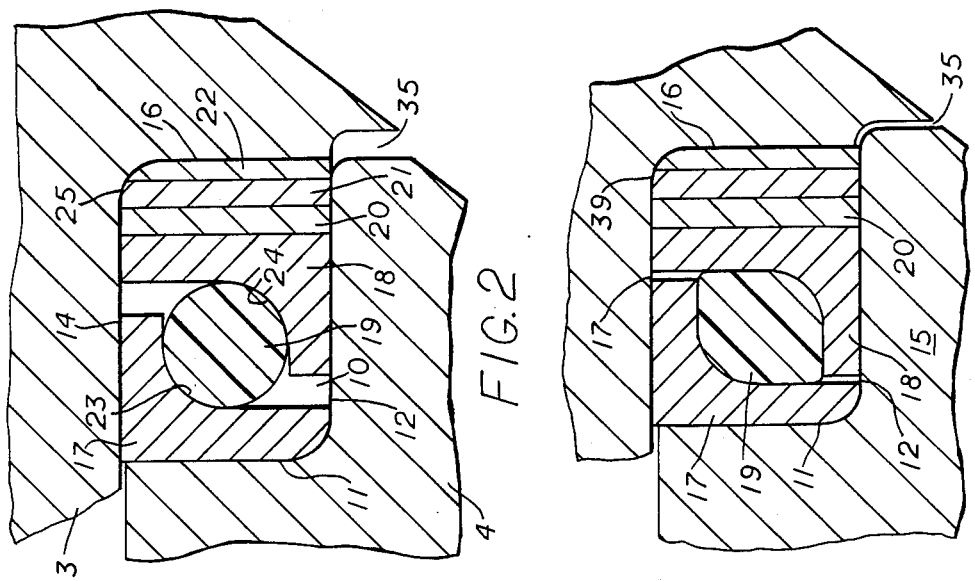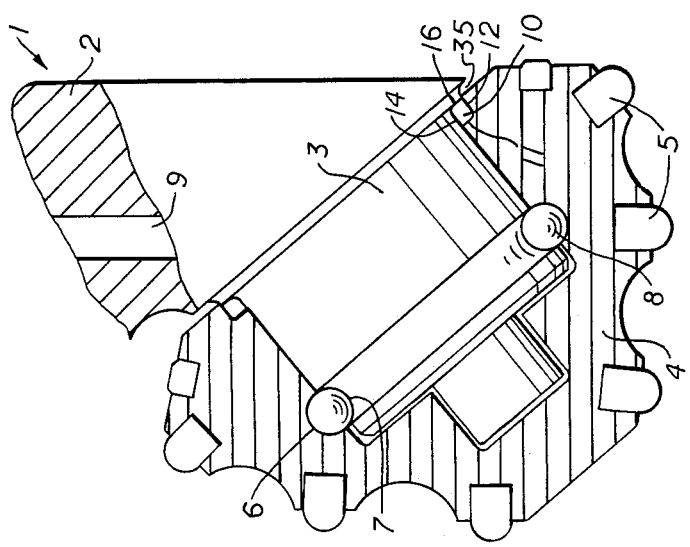

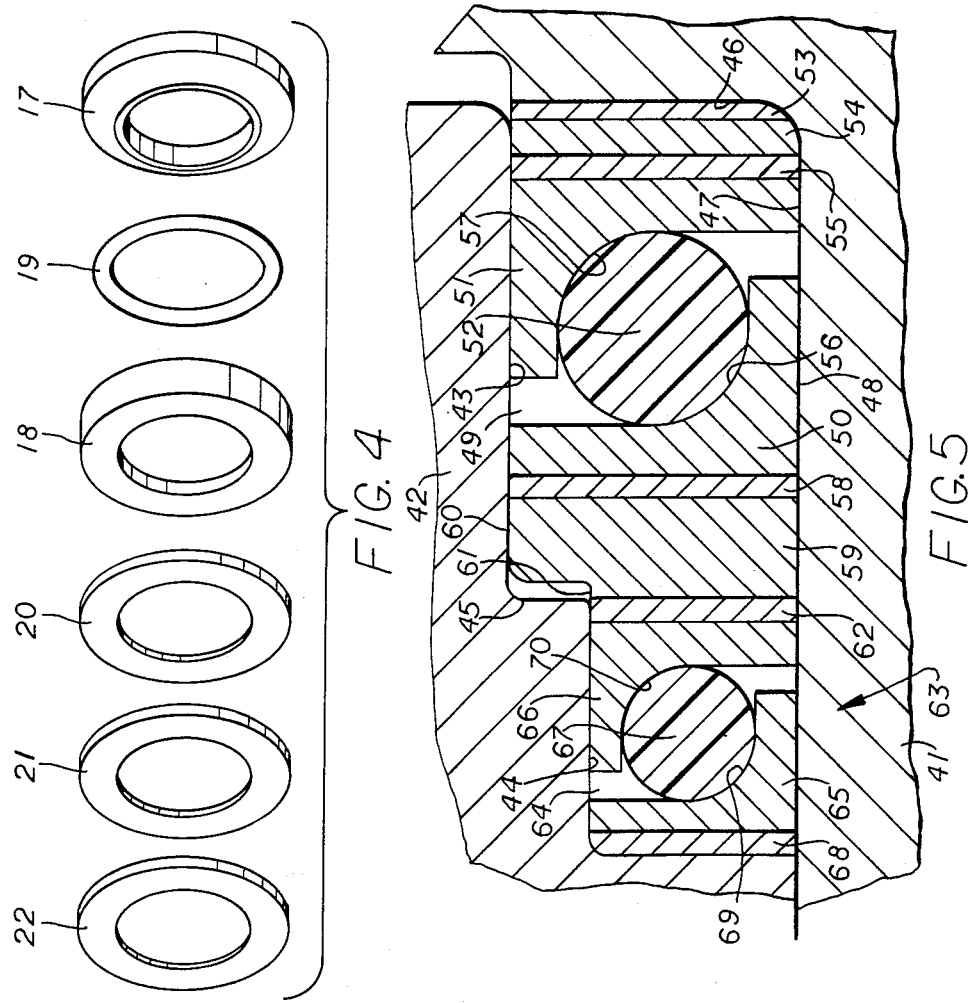

SEAL AND SEAL SHIELD ASSEMBLY FOR ROTARY DRILL BITS

BACKGROUND OF THE INVENTION

1. Field of the Invention

This invention relates generally to a seal for rock bits, and more particularly to improved seal and seal shield assemblies for retaining lubricant within the bearing area of a bit and sealing the bearings of the bit from abrasive materials in the borehole.

2. Brief Description of the Prior Art

Seal assemblies for use in applications involving a sliding, rotating or static journal member in a sleeve housing are in common use. As the seal assemblies often function in dynamic circumstances with differential pressure applied to the assemblies much effort has been directed to development and improvement of seal assemblies. The invention disclosed is applicable to the rotary cone rock bit but may be used in a variety of industrial applications.

Rotary cone rock bits in commercial use typically consist of a main bit body with multiple legs. Each leg supports a roller cone cutter on a bearing journal protruding from the leg. The cutter is typically maintained in position on the journal by a thrust-loaded ball bearing assembly. The annular space between the cutter cone and the bearing journal is filled with lubricant. Longevity of the rock bit assembly depends on maintaining appropriate clearance between the cutter cone bearing and bearing journal, and maintaining lubrication, which, in turn, is dependent on the seal assembly.

Roller cone rock bits have an axial opening through the main bit body for circulating drilling mud to wash the debris from drilling out through the bore hole. The seal assembly shields the bearing from contamination by the debris and retains the lubricant between the journal and cutter.

Problems are commonly encountered with sealed drilling bits in the following areas:

a. The destruction of the elastomer seal caused by the drill bit heating up and the elastomer seal adhering to the contacted steel members.

b. Abrasives and sharp particles contacting and thus cutting and abrading the seal, with further migration into the bearing, resulting in abrasion of the bearing and in the escape of lubrication.

c. Differential pressures on the seal assembly distorting the seal and allowing leakage.

d. Chemical decomposition of elastomer seal materials resulting from hydrogen sulfide, steam and other adverse substances encountered down hole.

PRIOR ART PATENTS

Galle, U.S. Pat. No. 3,361,494 discloses an O-ring seal.

Rife, U.S. Pat. No. 4,194,795 discloses the O-ring structure with a teflon shield located within the seal gland to retard shale from reaching and destroying the O-ring. Crow, U.S. Pat. No. 4,277,109, Oelke, U.S. Pat. No. 4,344,629, and Evans, et al, U.S. Pat. No. 4,452,539 disclose variations of the O-ring seal. Deane, et al, U.S. Pat. No. 4,466,622 discloses static elastomers supporting metal seal plates in lieu of dynamic O-rings.

The seal assemblies using dynamic O-rings are subject to the foregoing and other problems. The Deane patent allows contaminants into the seal gland causing abrasion and ultimate failure of the seal.

The present invention is distinguished over the prior art in general, and the foregoing patents in particular by a seal and seal shield assembly which is compression-loaded in an annular cavity to hold lubricant in the bit and protect against abrasive debris.

SUMMARY OF THE INVENTION

One of the objects of the invention is to provide an improved seal and seal shield assembly for rotary drill bits.

Another object of the invention is to provide a seal and seal shield assembly for a rotating, sliding or static journal member within a sleeve housing.

Another object of the invention is to provide a seal and seal shield assembly which maintains the pressure differential between the exterior of the seal assembly and the interior annular space between the journal bearing face and the cutter cone bearing face.

Still another object of the invention is to provide a seal and seal shield assembly to provide high positive pressure to the bearing surfaces to be sealed.

Still another object of the invention is to provide a seal and seal shield assembly with chemically inert contact surfaces.

Yet another object of the invention is to provide a seal and seal shield assembly with contact surfaces of self-lubricating materials.

Another object of the invention is to provide a seal and seal shield assembly which is self-compensating for pressure differentials.

Another object of the invention is to provide a seal and seal shield assembly which maintains equal pressure on axial and radial seal surfaces.

A further object of the invention is to provide multiple seal and seal shield assemblies which can be installed contiguously to improve sealing effectiveness.

It is a further object of the invention to provide a seal and seal shield assembly with shielding which extrudes from the mouth of the seal cavity.

Other objects of the invention will become apparent from time to time throughout the specification and claims as hereinafter related.

The above noted and other objects of the invention are accomplished by a novel seal and seal shield assembly for rotary drill bits having a journal member comprising a first bearing member, and a rolling cutter with a bore having an open end rotatably mounted thereon comprising a second bearing member. The rolling cutter has a counterbore at the open end defining an annular cavity. The seal and seal shield assembly is compression-loaded in the cavity to retain lubricant in the bit. The seal assembly has a pair of annular rings each with a radially extending wall and an axially extending wall defining an annular seal gland. An elastic spring member compression-loaded in the seal biases the exterior surfaces against the bearing surfaces. A flat malleable annular disc with lubricating properties is positioned at the outer face of the seal assembly and a rigid annular disc is positioned in supporting relation thereto. A second flat malleable annular disc is positioned at the outer face of the rigid disc adjacent to the journal member seal thrust face. The malleable annular disc members deform under pressure and extrude to seal voids at the bearing surfaces and to prevent the entrance of abrasive particulate matter.

BRIEF DESCRIPTION OF THE DRAWINGS

FIG. 1 is an axial sectional view of a roller cone rock bit journal and cutter cone assembly showing the seal and seal shield assembly location.

FIG. 2 is an axial sectional view of the seal assembly of this invention with a seal shield prior to compression-loading of the seal and seal shield assembly.

FIG. 3 is an axial sectional view of the seal assembly of this invention subsequent to compression-loading of the seal and seal shield assembly.

FIG. 4 is an exploded view of the seal and seal shield assembly of this invention.

FIG. 5 is a sectional view of an embodiment of the invention having a plurality of contiguous seal assemblies.

DESCRIPTION OF THE PREFERRED EMBODIMENT

Referring to the drawings by numerals of reference, in FIG. 1 there is shown a portion of a drill bit 1 having a body (not fully shown) with a leg portion 2 with a spindle or journal 3, and a cutter cone assembly 4. The drill bit is a conventional roller cone drill bit used for drilling rock and earth formations. Rotary drill bits of this general type comprise a bit body (not shown) threadably connected to a drill string member (not shown), the bit body having multiple legs, a portion of a typical leg 2 being shown in FIG. 1.

Roller cone cutter 4 is rotatably mounted on the journal 3 and has a plurality of inserts 5 for crushing rock and other materials in drilling. Various bearing assemblies (not shown), including friction bearings, roller bearings, and ball bearings, may be located in the bearing area between the cutter cone 4 and the journal 3.

The embodiment shown has a non-loaded, ball bearing assembly comprising a cutter cone ball bearing race 6, a journal ball bearing race 7, and a multiplicity of retainer balls 8, which are not loaded but function to retain the cone cutter 4 on the journal 3.

Each leg includes a lubrication system comprising a reservoir (not shown) located in the upper portion thereof. The reservoir communicates with a lubrication passage 9 which is connected with a multiplicity of passages in the journal to provide lubricant to the various bearing assemblies.

The seal and seal shield assembly 15 of the present invention is positioned between the cone cutter 4 and the journal 3 in the annular seal cavity 10. The annular seal cavity 10 is defined by the cutter cone seal thrust surface or journal end bearing surface 11, the cone cutter seal bearing surface or cutter side wall 12, the journal seal thurst surface or journal end bearing surface 16, and the journal seal bearing surface or journal peripheral surface 14. The journal seal thrust surface 16 and the journal seal bearing surface 14 are integrally connected and form fixed walls of the annular seal cavity 10, the journal seal bearing surface 14 representing a flange surface in relation to the journal 3. The cone cutter seal thrust face 11 and the cone cutter seal bearing surface 12 are integrally connected, the said surfaces being formed by an annular recess in the open end of the axial bore of the cone cutter 4.

The seal and seal shield assembly 15 (not shown in FIG. 1) is located in the annular seal cavity 10 to retain lubricant in the bearing area between the cutter cone 4 and the journal 3 and to prevent debris in the well bore from entering the bearing area. In FIG. 2, the seal and seal shield assembly 15 of the present invention is shown in the annular seal cavity 10 in a relaxed condition prior to compression-loading. A portion of the cone cutter 4 is depicted in close relationship to a portion of the journal 3.

The seal and seal shield assembly 15 comprises an inner seal ring 17 (a flexibly rigid material, preferably having lubricating properties, such as a teflon alloy or Ryton TM), an outer seal ring 18 (a flexibly rigid material, preferably having lubricating properties, such as a teflon alloy or Ryton TM), an annular spring member 19 (an elastic or elastomeric material such as a fluoro-elastomer, Alfas TM, Viton TM or Kalrez TM), a seal shield wiper ring 20, a seal shield stiffener ring 21, and a seal shield extrusion ring 22.

Inner seal ring 17 is cylindrical with an arcuate inner surface 23. Inner seal ring 17 engages journal bearing surface 14, cone cutter seal thrust surface 11, cone cutter seal surface 12, and spring member 19. Outer seal ring 18 is cylindrical with an arcuate inner surface 24. The outer seal ring 18 engages cone cutter seal surface 12, journal bearing surface 14, wiper ring 20, and spring member 19. Annular spring member (O-ring) 19 is compressed between inner seal ring surface 23 and outer seal ring surface 24.

Seal wiper ring 20 (preferably formed of a malleable material having lubricating properties and resistant to corrosion such as lead, gold or silver), has a flat rectangular cross-section and is positioned against outer seal ring 18 with its inner radial surface against the journal seal bearing surface 14 and outer radial surface against the cone cutter seal surface 12.

A seal shield stiffener ring 21 (preferably formed of a rigid abrasion and corrosion-resistant material such as steel or a non-ferrous material such as graphite) having a flat rectangular cross-sectional configuration with a rounded inner radial surface 25, is positioned against seal wiper ring 20 with its inner radial surface located against journal seal bearing surface 14 and its outer radial surface located against cone cutter seal surface 12.

Extrusion ring 22, with a flat rectangular cross-sectional configuration, is located against seal shield stiffener ring 21 with its inner radial surface located against the journal seal bearing surface 14 and its outer radial surface located against the cone cutter seal surface 12 and with the other axial surface located against the journal seal thrust surface 16. The extrusion ring 22 is formed of a malleable material having lubricating properties and resistant to corrosion such as lead, gold or silver. Lead is additionally desirable in rock bit applications as it is chemically inert and not subject to corrosion by hydrogen sulfide and other chemicals that may be encountered.

In FIG. 3, the seal and seal shield assembly 15 of the present invention is shown fully installed. Axial compressive forces are applied to the seal and seal shield assembly 15 by the cone cutter seal thrust surface 11 and the journal seal thrust surface 16. Spring member 19 is compressed and biases seal rings 17 and 18 against the cone cutter seal thrust surface 12 and against the journal seal bearing surface 14, the cone cutter seal bearing surface 12 and the seal shield wiper ring 20.

Seal wiper ring 20 is biased against the seal shield stiffener ring 21, the seal shield stiffener ring 21 against the seal shield extrusion ring 22, and the seal shield extrusion ring 22 against the journal seal thrust face 16.

In installed configuration, therefore, the seal and seal shield assembly 15 is biased against all surfaces defining the annular seal cavity 10.

In dynamic operation, the load applied to the seal and seal shield assembly 15 deforms malleable seal shield wiper ring 20 and malleable seal shield extrusion ring 22, extruding portions of wiper ring 20 and extrusion ring 22 into any voids that may occur at adjacent contact surfaces. Rounded inner radial surface 25 of seal shield stiffener ring 21 facilitates the migration of extruded malleable material into the space between the surface 25 and the journal seal bearing surface 14. This extrusion eliminates voids at the interfaces of seal shield members and their adjacent contacted surfaces, and material from the extrusion ring 22 is slowly extruded into outer annular space or peripheral opening 35 preventing the entrance of particulate matter and other foreign materials into the annular seal cavity 10.

In dynamic operation, the various thrust and radial surfaces may exhibit relative movement, with the contact surfaces experiencing less relative friction being the dynamic interfaces. The self-lubricating properties of materials comprising the seal shield wiper ring 20 and the seal shield extrusion ring 22 facilitate dynamic interfaces at their respective surfaces.

The spring member 19 remains static in relation to the inner seal ring inner surface 23 and the outer seal ring inner surface 24 under all conditions. It is therefore not subject to deterioration due to dynamic stresses. Furthermore, the spring member 19 is protected from contaminants and from chemical attack by the inner seal ring 17, the outer seal ring 18, the seal wiper ring 20, the seal shield stiffener ring 21 and the seal shield extrusion ring 22.

From the foregoing description it may be seen that the present seal and seal shield assembly 15 provides an efficient seal between the journal 3 and the cone cutter 4 retaining lubricating film within the bearing area between the journal 3 and the cone cutter 4 and preventing the entry of drilling debris.

In FIG. 5, there is shown another embodiment of the invention which illustrates the installation of multiple seal and seal shield assemblies in a cascaded configuration. A journal 41 and a cutter cone 42 are shown in cross-sectional view. Cutter cone 42 has two counterbores 43 and 44 with a shoulder 45 therebetween.

The seal and seal shield assembly of this embodiment comprises separate seal and seal shield assemblies assembled in spaced longitudinal relation between cutter cone 42 and the journal 41 in the annular seal cavities. One annular seal is defined by the cutter cone shoulder 45, the body seal bearing surface 46, the journal seal surface 47, and the surface of counterbore 43. The body seal surface 46 and the journal seal bearing surface 47 are integrally connected.

The seal and seal shield assembly 49 is located in the first annular seal cavity 48 to retain lubricant in the bearing area between cutter cone 42 and journal 41 and to prevent debris in the well bore from entering the bearing area. In FIG. 5, the seal and seal shield assembly 48 is shown in the annular seal cavity 49 in a relaxed condition prior to compression-loading. A portion of cone cutter 42 is shown in close relationship to a portion of the journal 41.

The seal and seal shield assembly 48 comprises inner seal ring 50 (a flexibly rigid material, preferably having lubricating properties, such as a teflon alloy or Ryton TM), outer seal ring 51 (a flexibly rigid material, preferably having lubricating properties, such as a teflon alloy or Ryton TM), annular spring member 52 (an elastic or elastomeric material such as a fluoro-elastomer, Alfas TM, Viton TM or Kalrez TM), a seal shield wiper ring 55, seal shield stiffener ring 54, and seal shield extrusion ring 53. Inner seal ring 50 is cylindrical with an arcuate inner surface 56. Inner seal ring 50 engages journal bearing surface 47, cone cutter surface 43 and spring member 52.

Outer seal ring 51 is cylindrical with an arcuate inner surface 57. The outer seal ring 51 engages cone cutter surface 43, journal bearing surface 47, wiper ring 55, and spring member 52. Annular spring member (O-ring) 52 is compressed between inner seal ring surface 56 and outer seal ring surface 57.

Seal wiper ring 55 (preferably formed of a malleable material having lubricating properties and resistant to corrosion such as lead, gold or silver), having a flat rectangular cross-section is positioned against journal seal bearing surface 46. A seal shield stiffener ring 54 (preferably formed of a rigid abrasion and corrosion-resistant material such as steel or a non-ferrous material such as graphite) of flat rectangular cross-sectional configuration is positioned against seal wiper ring 55 with its inner radial surface located against journal seal bearing surface 47 and its outer radial surface located against cone cutter seal surface 43.

Extrusion ring 53 (preferably formed of a malleable material having lubricating properties and resistant to corrosion such as lead, gold or silver), with a flat rectangular cross-sectional configuration, is located against seal shield stiffener ring 54 with its inner radial surface located against journal seal bearing surface 47 and its outer radialsurface located against cone cutter seal surface 43 and the other axial surface located against the journal seal thrust face 46.

Wiper ring 58, preferably formed of a malleable material having lubricating properties and resistant to corrosion such as lead, gold or silver), with a flat rectangular cross-sectional configuration, is located against spacer ring 59 (preferably formed of a rigid abrasion and corrosion-resistant material such as steel or a non-ferrous material such as graphite) with its inner radial surface located against journal seal bearing surface 47 and its outer radial surface located against cone cutter seal surface 43 and with the other radial surface located against seal ring 50. Spacer ring 59 has a first outside diameter 60 fitting counterbore 43 and a second, smaller outside diameter 61 fitting the second counterbore 44.

A wiper ring 62 fits the second counterbore 44 and abuts the smaller O.D. portion 61 of spacer ring 59. The other side of wiper ring 62 abuts one side of a second seal and seal shield assembly 63. The seal and seal shield assembly 63 is located in the second annular seal cavity 64 and is shown in a relaxed condition prior to compression-loading.

The second seal and seal shield assembly 63 comprises inner seal ring 65 (flexibly rigid material, preferably having lubricating properties, such as a teflon alloy or Ryton TM), outer seal ring 66 (a flexibly rigid material, preferably having lubricating properties, such as a teflon alloy or Ryton TM), annular spring member 67 (an elastic or elastomeric material such as a fluoro-elastomer, Alfas TM, Viton TM or Kalrez TM), and seal shield wiper ring 68.

Inner seal ring 65 is cylindrical with an arcuate inner surface 69. Inner seal ring 65 engages journal bearing surface 47, cone cutter surface 44 and spring member 67. Outer seal ring 66 is cylindrical with an arcuate inner surface 70. The outer seal ring 66 engages cone cutter surface 44, journal bearing surface 47, wiper ring 62, and spring member 67. Annular spring member (O-ring) 67 is compressed between inner seal ring surface 69 and outer seal ring surface 70.

The embodiment depicted in FIG. 5 is particularly useful in applications involving significant pressure differentials between the environments on the inner and outer journal surfaces. Also, this embodiment, as well as the first embodiment, is applicable to sealing a rotary shaft in structures other than rotary cone drill bits. In particular, this improved bearing seal and bearing seal shield assembly provides sealing and seal protection for rotary shafts operating in an abrasive environment, such as rotary drilling, boring, and grinding tools, and the like.

While this invention has been described fully and completely, with special emphasis on two preferred embodiments, it should be understood that, within the scope of the appended claims, this invention may be practiced otherwise than as specifically described herein.

What is claimed is:

1. A seal and seal shield assembly for a rotary drill bit of the type comprising
    a main bit body having at least one leg extending downwardly therefrom
    said leg having a generally cylindrical journal extending radially inward therefrom comprising a first bearing member of the bit,
    said journal having end bearing surface on the surface of said leg at the juncture of the journal therewith,
    a hollow roller cutter with an open end rotatably mounted on each journal, having a bore forming a bearing surface cooperable with said journal, and having a counterbore at the open end thereof defining an annular seal cavity in cooperation with the peripheral surface of said journal and said journal end bearing surface with a peripheral opening therefrom,
    said annular seal cavity having a fixed end wall comprising said journal end bearing surface, a journal end wall on said roller cutter spaced from said journal end bearing surface and movable relative thereto, a fixed side wall comprising the peripheral surface of said journal, and a side wall on said roller cutter spaced from said journal peripheral surface and movable relative thereto, and
    means for introducing lubricant into the space between said hollow cutter and said journal,
    said seal and seal shield assembly comprising
    a first flat annular disc of a soft malleable, corrosion-resistant metal, extrudable under conditions of temperature and pressure normally encountered during use, with lubricating properties, positioned in said annular bearing cavity and engageable in bearing relation with said journal end bearing surface,
    a second flat annular disc of a strong, rigid material positioned in said annular seal cavity in supporting relation to said first disc, and
    spring means in said annular seal cavity biasing said second disc to urge said first disc against said journal end bearing surface so that said first disc maintains bearing contact therewith and extrudes through said seal cavity peripheral opening under load.

2. A rotary drill bit seal and seal shield assembly according to claim 1 including
    sealing means positioned in said seal cavity, and
    said spring means biasing said sealing means to urge said first disc against said journal end bearing surface.

3. A rotary drill bit seal and seal shield assembly according to claim 2 including
    a third flat annular disc of a soft malleable corrosion-resistant metal with lubricating properties positioned in said annular seal cavity and engageable with said second flat annular disc and said sealing means.

4. A rotary drill bit seal and seal shield assembly according to claim 1 in which
    said first flat annular disc is lead, gold or silver, and
    said second flat annular disc is iron, steel or graphite.

5. A rotary drill bit seal and seal shield assembly according to claim 3 in which
    said third flat annular disc is lead, gold or silver.

6. A rotary drill bit seal and seal shield assembly according to claim 2 in which
    said sealing means comprises a first sealing ring in said annular seal cavity engaging one of said seal cavity side walls, and a second sealing ring in said annular seal cavity engaging another of said seal cavity side walls and said second malleable metal disc, and
    said spring means being positioned between said sealing rings to bias the same against said seal cavity side walls while biasing said first disc against said journal end bearing surface.

7. A rotary drill bit seal and seal shield assembly according to claim 6 in which
    said first flat annular disc is lead, gold or silver, and
    said second flat annular disc is iron, steel or graphite.

8. A rotary drill bit seal and seal shield assembly according to claim 6 including
    a third flat annular disc of lead, gold or silver with lubricating properties positioned in said annular seal cavity and engageable in bearing relation with said second flat annular disc and seal sealing means.

9. A rotary drill bit seal and seal shield assembly according to claim 6 in which
    said sealing rings have external surfaces of the same shape as the walls of said seal cavity contacted thereby and have a smooth sliding contact therewith,
    said sealing rings have inwardly facing surfaces spaced from each other and defining an annular cavity therebetween, and
    said spring means being positioned in the annular cavity between said sealing rings and having no contact with the walls of said cavity.

10. A rotary drill bit seal and seal shield assembly according to claim 1 in which
    said spring means comprises an elastically compressible O-ring.

11. A rotary drill bit seal and seal shield assembly according to claim 6 in which
    said sealing rings have external surfaces of the same shape as the walls of said seal cavity contacted thereby and have a smooth sliding contact therewith
    and have inwardly facing circumferential concave surfaces spaced from each other and defining an annular cavity therebetween, and said spring means comprises an elastically compressible O-ring positioned in the annular cavity between said sealing rings and having no contact with the walls of said cavity.

12. A rotary drill bit seal and seal shield assembly according to claim 6 in which
said sealing rings are each of a hard, low-friction thermoplastic or thermosetting resin, and
said spring means comprises an elastically compressible O-ring of a fluoro-elastomer positioned in the annular cavity between said sealing rings and having no contact with the walls of said cavity.

13. A rotary drill bit seal and seal shield assembly according to claim 12 in which
said first flat annular disc is lead, gold or silver, and
said second flat annular disc is iron, steel or graphite.

14. A rotary drill bit seal and seal shield assembly according to claim 12 including
a third flat annular disc of lead, gold or silver with lubricating properties positioned in said annular seal cavity and engageable in bearing relation with said second flat annular disc and said sealing means.

15. A rotary drill bit seal and seal shield assembly according to claim 1 in which
said hollow roller cutter has first and second spaced counterbores at the open end thereof defining a pair of annular seal cavities, with an end wall therebetween, in cooperation with the peripheral surface of said journal and said journal end bearing surface with a peripheral opening therefrom,
said first annular seal cavity having a fixed end wall comprising said journal end bearing surface and said end wall on said roller cutter between said first and second cavities, and a fixed side wall comprising the peripheral surface of said journal and a side wall on said roller cutter spaced from said journal peripheral surface and movable relative thereto, and
said second annular seal cavity having an end wall comprising the end of said second counterbore and a fixed side wall comprising the peripheral surface of said journal and a side wall on said roller cutter spaced from said journal peripheral surface and movable relative thereto,
means for introducing lubricant into the space between said hollow cutter and said journal,
said seal and seal shield assembly comprising
a first flat annular disc of a soft malleable metal with lubricating properties positioned in said first annular bearing cavity and engageable in bearing relation with said journal end bearing surface,
a second flat annular disc of a strong, rigid material positioned in said first annular seal cavity in supporting relation to said first disc, and
spring means in said first annular seal cavity biasing said second disc to urge said first disc against said journal end bearing surface so that said first disc maintains bearing contact therewith and extrudes through said seal cavity peripheral opening under load.

16. A rotary drill bit seal and seal shield assembly according to claim 1 including
a plurality of longitudinally spaced sealing means positioned in said seal cavities, and
said spring means being a plurality of spring members cooperatively biasing separate ones of said longitudinally spaced sealing means against said seal cavity side walls and said first disc against said journal end bearing surface.

17. A rotary drill bit seal and seal shield assembly according to claim 16 including
a third flat annular disc of a soft malleable metal with lubricating properties positioned in said first annular seal cavity and engageable with said second flat annular disc and one of said sealing means.

18. A rotary drill bit seal and seal shield assembly according to claim 16 in which
a first one of said sealing means comprises a first sealing ring in said first annular seal cavity engaging one of said seal cavity side walls, and a second sealing ring in said first annular seal cavity engaging another of said seal cavity side walls and said second malleable metal disc,
one of said spring means being positioned between said sealing rings to bias the same against said seal cavity side walls while biasing said first disc against said journal end bearing surface,
a second one of said sealing means comprises a third sealing ring in said second annular seal cavity engaging two of said second cavity side walls, and a fourth sealing ring in said second annular seal cavity engaging another of said seal cavity side walls and an end wall of said counterbore, and
another of said spring means being positioned between said third and fourth sealing rings to bias the same against said seal cavity side walls and said end wall of said second counterbore.

19. A rotary drill bit seal and seal shield assembly according to claim 18 including
spacer means between said first and second sealing means, and
a fourth flat annular disc of a soft malleable metal with lubricating properties positioned in said second annular cavity and engageable with said second one of said sealing means, and said end wall of said second counterbore.

20. A rotary drill bit seal and seal shield assembly according to claim 19 in which
said spacer means comprises a flat disc of a strong, rigid material positioned in said first annular seal cavity between said first and second sealing means, and
a pair of flat discs of a soft malleable metal with lubricating properties positioned in said annular bearing cavities on opposite sides of said spacer means rigid disc and engageable with respective ones of said sealing means.

21. A rotary drill bit seal and seal shield assembly according to claim 17 in which
said malleable metal is lead, gold or silver.

22. A rotary drill bit seal and seal shield assembly according to claim 18 in which
said malleable metal is lead, gold or silver.

23. A rotary drill bit seal and seal shield assembly according to claim 19 in which
said malleable metal is lead, gold or silver.

24. A rotary drill bit seal and seal shield assembly according to claim 20 in which
said malleable metal is lead, gold or silver, and
said spacer rigid disc is iron, steel or graphite.

25. A rotary drill bit seal and seal shield assembly according to claim 16 in which
said roller cutter has two concentric counterbores defining two longitudinally aligned annular sealing cavities with a shoulder forming an end wall between said cavities, and said separate sealing means being positioned one in each of said annular cavities.

26. A rotary drill bit seal and seal shield assembly according to claim 25 including spacer means between said first and second sealing means.

27. A rotary drill bit seal and seal shield assembly according to claim 26 in which said spacer means comprises a flat annular disc of a strong, rigid material of a configuration fitting both of said annular cavities and positioned between said first and second sealing means, and a pair of flat annular discs of a soft malleable metal with lubricating properties positioned in respective ones of said annular cavities on opposite sides of said spacer means rigid disc and engageable with respective ones of said sealing means.

28. A rotary drill bit seal and seal shield assembly according to claim 27 in which said malleable metal is lead, gold or silver, and said spacer rigid disc is iron, steel or graphite.

29. A seal and seal shield assembly for a rotary shaft assembly of the type comprising a main body having at least one shaft extending outwardly therefrom and having an end bearing surface at the shaft juncture, a hollow rotary member mounted on said shaft for relative rotary movement and having a bore forming a bearing surface cooperable with said shaft, and having a counterbore at the open end thereof defining an annular seal cavity in cooperation with the peripheral surface of said shaft and said body end bearing surface with a peripheral opening therefrom, said annular seal cavity having a fixed end wall comprising said body end bearing surface and a shaft end wall on said rotary member spaced from said end bearing surface and movable relative thereto, and a fixed side wall comprising the peripheral surface of said shaft and a side wall on said rotary member spaced from said shaft peripheral surface and movable relative thereto, and lubricant contained in the space between said rotary member and said shaft, said seal and seal shield assembly comprising a first flat annular disc of a soft malleable, corrosion-resistant metal, extrudable under conditions of temperature and pressure normally encountered during use, with lubricating properties, positioned in said annular seal cavity and engageable in bearing relation with said shaft end bearing surface, a second flat annular disc of a strong, rigid material positioned in said annular seal cavity in supporting relation to said first disc, and spring means in said annular seal cavity biasing said second disc to urge said first disc against said end bearing surface so that said first disc maintains bearing contact therewith and extrudes through said seal cavity peripheral opening under load.

30. A rotary seal and seal shield assembly according to claim 29 including sealing means positioned in said seal cavity, and said spring means biasing said sealing means against said seal cavity side walls and said first disc against said end bearing surface.

31. A rotary seal and seal shield assembly according to claim 30 including a third flat annular disc of a soft malleable metal with lubricating properties positioned in said annular seal cavity and engageable in bearing relation with said second flat annular disc and said sealing means.

32. A rotary seal and seal shield assembly according to claim 29 in which said first flat annular disc is lead, gold or silver, and said second flat annular disc is iron, steel or graphite.

33. A rotary seal and seal shield assembly according to claim 31 in which said third flat annular disc is lead, gold or silver.

* * * * *